United States Patent
Wang et al.

(10) Patent No.: US 8,369,232 B2
(45) Date of Patent: Feb. 5, 2013

(54) TERMINAL DEVICE, SYSTEM AND METHOD FOR MEASURING TRAFFIC BASED ON USER SERVICES

(75) Inventors: Feng Wang, Shenzhen (CN); Tao Jiang, Shenzhen (CN); Wei Huang, Shenzhen (CN); Peilong Tan, Shenzhen (CN); Jun Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1124 days.

(21) Appl. No.: 12/174,695

(22) Filed: Jul. 17, 2008

(65) Prior Publication Data

US 2008/0273471 A1    Nov. 6, 2008

Related U.S. Application Data

(63) Continuation of application No. PCT/CN2007/000159, filed on Jan. 16, 2007.

(30) Foreign Application Priority Data

Jan. 17, 2006 (CN) .......................... 2006 1 0001449

(51) Int. Cl.
*H04L 12/26* (2006.01)
*H04L 12/56* (2006.01)
*G06F 15/173* (2006.01)
*H04M 15/00* (2006.01)

(52) U.S. Cl. ..................... 370/252; 370/395.2; 370/352; 379/111; 379/112.01; 379/114.08; 379/133; 709/224; 709/217; 709/225

(58) Field of Classification Search .................. 370/252, 370/395.2, 352–356; 709/217–226; 379/111, 379/112.01, 113, 112.06, 114.08, 114.05, 379/133
See application file for complete search history.

(56) References Cited

U.S. PATENT DOCUMENTS

| 6,311,054 | B1 |   | 10/2001 | Korpela |
| 6,687,817 | B1 |   | 2/2004 | Paul |
| 7,496,661 | B1 | * | 2/2009 | Morford et al. ............... 709/224 |
| 7,733,870 | B1 | * | 6/2010 | Liu et al. .................... 370/395.2 |
| 7,760,657 | B1 | * | 7/2010 | Hogg ........................... 370/247 |
| 7,774,456 | B1 | * | 8/2010 | Lownsbrough et al. ...... 709/224 |

(Continued)

FOREIGN PATENT DOCUMENTS

| CN | 1395391 |   | 2/2003 |
| CN | 1601982 | A | 3/2005 |

(Continued)

OTHER PUBLICATIONS

International Search Report for International Application No. PCT/CN2007/000159, dated Apr. 15, 2007, with english translation.

(Continued)

*Primary Examiner* — Chandrahas Patel
*Assistant Examiner* — Wutchung Chu
(74) *Attorney, Agent, or Firm* — Slater & Matsil, L.L.P.

(57) ABSTRACT

A terminal device includes a service type distinguishing module and a traffic measuring module. The service type distinguishing module is adapted to distinguish types of services accessed by the terminal device; the traffic measuring module is adapted to measure the traffic of each service type according to the service types distinguished by the service type distinguishing module. The present disclosure also discloses a system and method for measuring traffic based on user services. With the technical scheme of the disclosure, traffic of different service types can be measured respectively on a terminal device, so that the charging system is able to apply different charging policies to different service types.

4 Claims, 4 Drawing Sheets

U.S. PATENT DOCUMENTS

| | | | |
|---|---|---|---|
| 7,843,843 B1 * | 11/2010 | Papp et al. | 370/252 |
| 2001/0028631 A1 * | 10/2001 | Iwamura et al. | 370/230 |
| 2002/0013844 A1 * | 1/2002 | Garrett et al. | 709/225 |
| 2002/0124087 A1 * | 9/2002 | Asai et al. | 709/226 |
| 2002/0177429 A1 | 11/2002 | Watler et al. | |
| 2004/0255009 A1 * | 12/2004 | Judka et al. | 709/220 |
| 2005/0026592 A1 | 2/2005 | Walter et al. | |
| 2006/0050711 A1 | 3/2006 | Lialiamou et al. | |
| 2006/0072467 A1 * | 4/2006 | Manthoulis et al. | 370/241 |

FOREIGN PATENT DOCUMENTS

| | | |
|---|---|---|
| CN | 1625116 | 6/2005 |
| CN | 1681283 | 10/2005 |
| CN | 101005381 B | 5/2012 |
| WO | WO-2004036890 | 4/2004 |
| WO | WO-2005057816 | 6/2005 |
| WO | WO 2006081832 A1 * | 8/2006 |

OTHER PUBLICATIONS

Focus Group Technical Specification Part 5: Operations, Administration and Maintenance & Provision aspects for FS-VDSL Services (Jun. 2002).

Technical Report DSL Forum TR-065 dated Mar. 2004.

European Search Report regarding Application No. 07702091.5—PCT/CN2007000159 dated Feb. 9, 2009.

Chinese Rejection Decision regarding Application No. 200610001449.5, mailed Mar. 18, 2010. Translation provided by Huawei Technologies Co., Ltd.

European Office Action regarding Application No. 07 702 091.5-1525, dated Jun. 8, 2009.

First Chinese Office Action regarding Application No. 200610001449.5, mailed May 9, 2008. Translation provided by Huawei Technologies Co., Ltd.

* cited by examiner

| User identifier information | Service type | Uplink traffic | Downlink traffic | Service type | Uplink traffic | Downlink traffic | Service type | Uplink traffic | Downlink traffic |
|---|---|---|---|---|---|---|---|---|---|
| Terminal device 1 | Voice service | 100K Bytes | 100K Bytes | Data service | 1KBytes | 64M Bytes | Video service | 1KByes | 10M Bytes |

Figure 7

TERMINAL DEVICE, SYSTEM AND METHOD FOR MEASURING TRAFFIC BASED ON USER SERVICES

CROSS-REFERENCE TO RELATED APPLICATIONS

This application is a continuation of International Application No. PCT/CN2007/000159, filed Jan. 16, 2007. This application claims the benefit of Chinese Application No. 200610001449.5, filed Jan. 17, 2006. The disclosures of the above applications are incorporated herein by reference.

FIELD

The present disclosure relates to network communication technologies, and in particular, to a terminal device, system and method for measuring traffic based on user services.

BACKGROUND

The statements in this section merely provide background information related to the present disclosure and may not constitute prior art.

Broadband Internet access is increasingly popular. The charging for broadband Internet access is also attracting more and more attention. Monthly fee charging, duration based charging and traffic based charging are three mainstream charging modes.

Reasonable charging mode should be based on the traffic and the service type. Therefore, it is urgent to implement charging based on the user service type and traffic. In prior arts, however, it is impossible for any of the preceding charging modes to collect traffic information based on the service type and therefore, charging based on the service type is impossible.

SUMMARY

The present disclosure discloses a terminal device, system and method for measuring traffic based on user services, enabling traffic measurement based on different types of services.

The present disclosure provides a terminal device, including: a service type distinguishing module, adapted to distinguish types of services accessed by the terminal device; and a traffic measuring module, adapted to measure traffic of each service type distinguished by the service type distinguishing module.

The present disclosure also provides a system for measuring traffic based on user services including: a network side device and a terminal device, wherein the network side device, is adapted to send service configuration information to the terminal device; and the terminal device, is adapted to distinguish types of services accessed by the terminal device according to the received service configuration information, and measure traffic of each type of service separately.

The present disclosure provides a method for measuring traffic based on user services, including:

A, distinguishing, by a terminal device, types of services accessed by the terminal device; and B, measuring, by the terminal device, traffic of each of the distinguished service types.

According to the present disclosure, service types are distinguished on a terminal device and the traffic of different types of services is measured respectively. Thus, the measurement of the traffic of each service type is enabled on the terminal device. In addition, in the present disclosure, traffic measurement information based on user services is reported to the network side, so that the charging system can apply different charging policies to different service types. At the same time, it is realized to charge for different services separately on a terminal device, the network configuration is hence more flexible and more reasonable.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 7 shows a schematic diagram the contents of a message that carries traffic measurement information sent by the terminal device according to an embodiment.

DETAILED DESCRIPTION

The following description is merely exemplary in nature and is not intended to limit the present disclosure, application, or uses.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

For better understanding of the purpose, technical scheme and benefits, the various embodiments of the disclosure will be described by reference to the accompanying drawings.

The key of the present disclosure is to distinguish the types of services on a terminal device and measure the traffic of each service type respectively.

Figure 1:
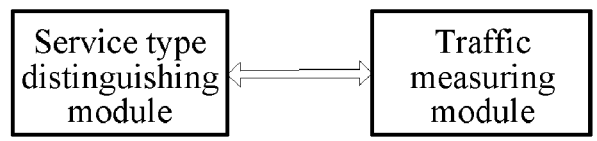
FIG. 1 is a schematic diagram illustrating the main structure of the terminal device according to an embodiment.

According to an embodiment, a terminal device shown in FIG. 1, includes a service type distinguishing module and a traffic measuring module. The service type distinguishing module distinguishes the types of services accessed by the terminal device. The traffic measuring module measures the traffic of each service type distinguished by the service type distinguishing module.

The service type distinguishing module may distinguish services accessed by the terminal device by determining the type of service accessed via each port, based on the service configuration information that includes the mapping relationship between ports and service types in the terminal device. Then the traffic measuring module measures the traffic at each port to achieve measuring traffic based on user services. The service configuration information may be set on the terminal device or sent by the network side to the terminal device.

Figure 2:
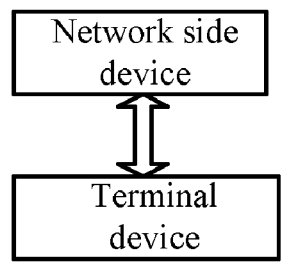
FIG. 2 is a schematic diagram of the system for measuring traffic according to an embodiment.

When the service configuration information in the terminal device is from the network side, the terminal device is based on a system shown in FIG. 2, which includes a network device and a terminal device. The network device sends service configuration information to the terminal device. The service configuration information includes a mapping relationship between ports of the terminal device and service types. The terminal device distinguishes types of services accessed by the terminal device according to the received service configuration information and measures the traffic of each service type.

The preceding system may be a passive optical network (PON). Then, the terminal device is an optical network terminal (ONT) and the network device may include: a terminal service configuration server, an operation support system (OSS), an equipment management server (EMS) and an optical line terminal (OLT). The following provides details of the various embodiments.

Figure 3:
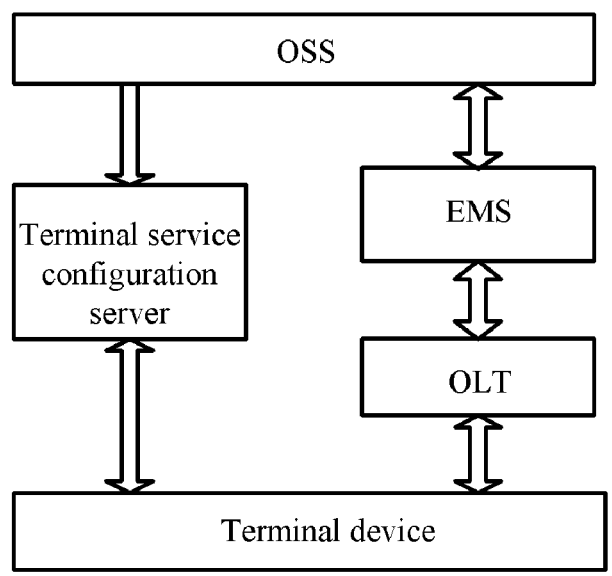
FIG. 3 shows the structure of the system for measuring traffic according to an embodiment.

FIG. 3 shows the structure of the system for measuring traffic according to an embodiment. As shown in FIG. 3, the system includes an OLT, an EMS, an OSS, a terminal service configuration server and a terminal device.

The OLT is adapted to forward messages between the terminal device and the EMS. This includes sending a registration request from the terminal device to the EMS. The registration request contains a terminal identifier.

The EMS stores identifier information and port information of the terminal device. It may report the identifier information and port information of the terminal device to the OSS according to the registration request of the terminal device, receive the OLT configuration information associated with the terminal device from the OSS and configure the OLT.

The OSS is adapted to receive the identifier information and port information sent from the EMS, determine the service configuration information of the terminal device according to the information, forward the service configuration information of the terminal device to the terminal service configuration server, and send the OLT configuration information associated with the terminal device to the EMS. The terminal service configuration information determined by the OSS includes a mapping relationship between ports of the terminal device and service types.

The terminal service configuration server is adapted to receive service configuration information from the OSS and store the information; and, upon receipt of a service configuration request from the terminal device, obtain the corresponding service configuration information according to the request and send the obtained service configuration information to the terminal device.

The terminal device is adapted to send a registration request to the OLT and a service configuration request to the terminal service configuration server, and receive service configuration information from the terminal service configuration server. It distinguishes service types by ports according to the service configuration information, measures the traffic volume of each service type by measuring the traffic at each port, and report the measured traffic information to a charging management server.

Figure 4:
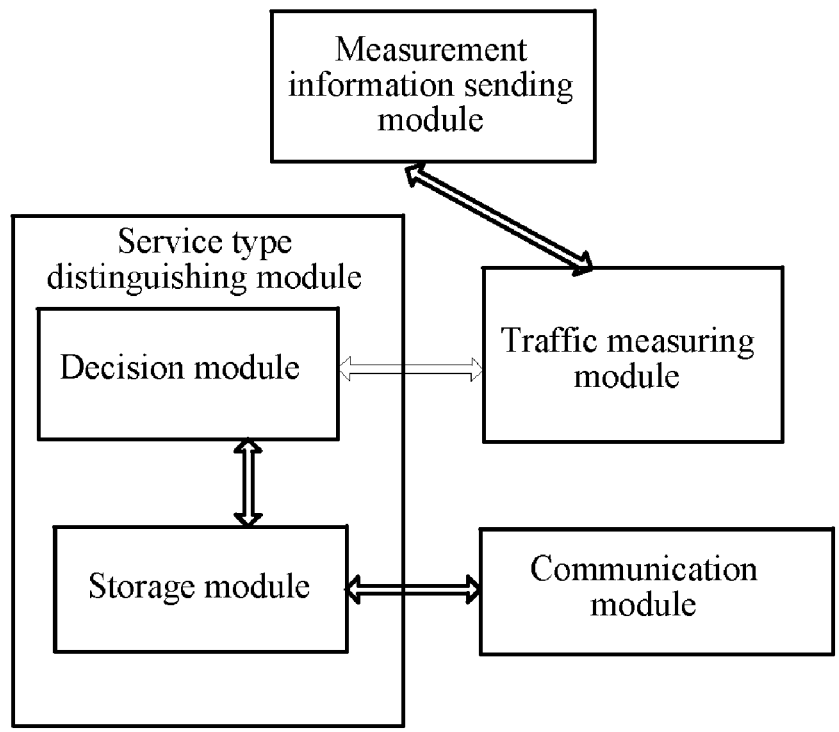
FIG. 4 shows the structure of a terminal device in the system for measuring traffic according to an embodiment.

Specifically, the composition of the preceding terminal device is shown in FIG. 4. The terminal device includes a service type distinguishing module, a traffic measuring module, a communication module, a service configuration requesting module and a measurement information sending module, where the service type distinguishing module may further include a service type determining module and a storage module.

The storage module is adapted to store service configuration information that contains a mapping relationship between ports and service types.

The service type determining module is adapted to distinguish types of services accessed by the terminal device by determining a service type associated with each port according to the service configuration information stored in the storage module, and notify the traffic measuring module of the service type associated with each port. If it's set in the service configuration information is that port 1 is used for accessing voice service, port 2 for accessing data service, and port 3 for accessing video service, according to the service configuration information, the service type determining module can determine that the service accessed via port 1 is voice service, the service accessed via port 2 is data service and the service accessed via port 3 is video service.

The service configuration information may be set in the storage module by the terminal device, or obtained by the terminal device from the terminal service configuration server.

The service configuration requesting module is adapted to generate a service configuration request that contains a terminal identifier and send the request to the terminal service configuration server.

The communication module is adapted to receive service configuration information sent by the terminal service configuration server and store the service configuration information to the storage module.

The measurement information sending module is adapted to send traffic measurement information to a charging management server at the network side. Specifically, the measurement information may be sent at regular intervals. The traffic measurement information includes identifier information of a terminal device, service type titles and the uplink and downlink traffic of each service type.

The system may further include a charging management server, adapted to receive traffic measurement information sent by the terminal device and charge for the user service according to the measurement information.

The above describes the system for measuring traffic and the terminal device in the system through detailed embodiments. The following embodiments describe the method for measuring traffic in details.

Figure 5:
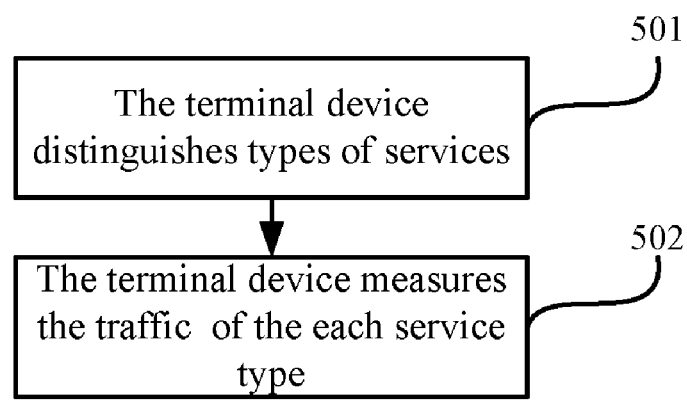
FIG. 5 shows a general flowchart for measuring traffic based on user services according to an embodiment.

In the method for measuring traffic based on user services, the terminal device first distinguishes service types and then measures traffic. As shown in FIG. 5, the general process of the method includes:

At 501: The terminal device distinguishes types of services accessed by the terminal device.

At 502: The terminal device measures the traffic of each of the distinguished service types.

At 501, the terminal device may distinguish services accessed via different ports according to the service configuration information that is preconfigured in the terminal device or sent actively by the network side to the terminal device or sent upon request of the terminal and includes a mapping relationship between ports and service types. Then, the terminal can measure the traffic of each service type by measuring the traffic at each port.

In an embodiment, the method for measuring traffic is applied to a PON, and a terminal device requests service configuration information from the network side.

Figure 6:
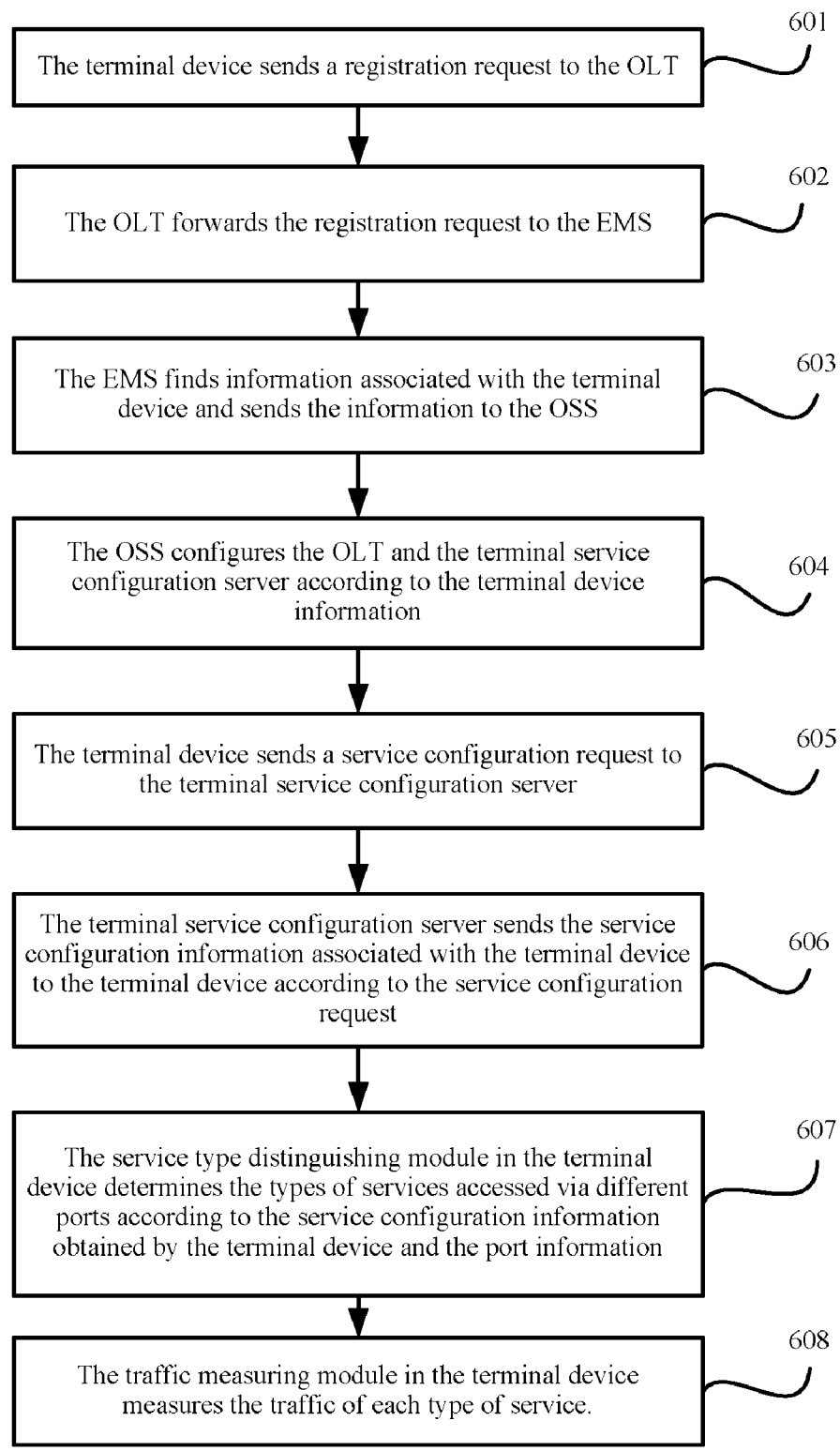
FIG. 6 shows a flowchart for measuring traffic according to an embodiment.

In this embodiment, a terminal device first triggers an OSS to send the service configuration information associated with the terminal device to a terminal service configuration server and send the associated OLT configuration information to an EMS. On this basis, the terminal device requests the associated service configuration information from the terminal service configuration server. The service configuration information contains a mapping relationship between ports of the terminal device and services. Then, the service type distinguishing module of the terminal device can distinguish services according to the service configuration information and the traffic measuring module can measure the traffic of each distinguished service. The specific process, as shown in FIG. 6, includes:

At 601: The terminal device sends a registration request to the OLT. The registration request contains identifier information of the terminal device, such as a terminal ID.

At 602: The OLT forwards the registration request to the EMS.

At 603: The EMS finds information associated with the terminal device in its database according to the identifier information in the terminal registration request. The founded information includes the terminal type, port type of the terminal device and number of ports. The EMS reports the information to the OSS. For example, the OMS finds that the terminal device is an optical access device and the number of ports is 4 according to the terminal ID.

At 604: The OSS generates service configuration information of the terminal device according to the terminal type and number of ports and sends the service configuration information to the terminal service configuration server. The terminal service configuration server may store the service configuration information in its database. In addition, the OSS sends device configuration information set for the OLT to the EMS and the EMS configures the OLT according to the device configuration information. The service configuration information may specify a port for each type of service; the device configuration information may be so set as to allow the services uploaded by terminals under the OLT pass.

Now, the terminal service configuration server has the service configuration information associated with the terminal device. The terminal device can obtain the associated service configuration information after sending a request for service configuration information to the terminal service configuration server.

At 605: The terminal device sends a service configuration request to the terminal service configuration server. The message contains identifier information of the terminal device, such as a terminal ID.

At 606: The terminal service configuration server searches its database for service configuration information associated with the terminal device according to the terminal identifier information in the service configuration request and sends the associated service configuration information to the terminal device.

At 607: The service type distinguishing module in the terminal device determines the types of services accessed via different ports according to the service configuration information obtained by the terminal device and the port information.

After the terminal device obtains the service configuration information, its service type distinguishing module can determine the type of an accessed service according to the service configuration information. For example, the service configuration information includes: port 1 for access to voice service and assigned VLAN 100, port 2 for access to data service and assigned VLAN 200, and port 3 for access to video service and assigned VLAN 300. Then, the service type distinguishing module tags the service accessed via port 1 with a voice service VLAN ID 100, the service accessed via port 2 with a data service VLAN ID 200, and the service accessed via port 3 with a video service VLAN ID 300. Thus, services accessed by the terminal device are distinguished.

At 608: The traffic measuring module in the terminal device measures the traffic of each type of service. The traffic measuring module measures the traffic of each type of service respectively. For example, the measurement result is as follows: for the voice service, the uplink traffic is 100 KB, and the downlink traffic is 100 KB; for the data service, the uplink traffic is 1 KB, and the downlink traffic is 64 MB; for the video service, the uplink traffic is 1 KB, and the downlink traffic is 10 MB.

To enable the service provider to charge for each type of service, the terminal device may send the traffic measurement result to the service provider after measuring the traffic of each type of service. The service provider can then apply different charging policies to different services and complete charging with reference to the traffic measurement of each service type. The terminal device may send traffic measurement information at regular intervals in the form of a message. The traffic measurement message contains identifier information of the terminal device, service type titles and the uplink and downlink traffic of each service type. As shown in FIG. 7, for terminal device 1, the uplink traffic of voice service is 100 KB and the downlink traffic of voice service is 100 KB; the uplink traffic of data service is 1 KB and the downlink traffic of data service is 64 MB; and the uplink traffic of video service is 1 KB and the downlink traffic of video service is 10 MB.

Although the disclosure has been described through some exemplary embodiments, it is not limited to such embodiments. It is apparent that those skilled in the art can make various modifications and variations without departing from the spirit and scope of the disclosure. The disclosure is intended to cover the modifications and variations provided that they fall in the scope of protection defined by the following claims or their equivalents.

What is claimed is:

1. A system for measuring traffic based on user services, comprising:

a terminal device, configured to send a registration request that comprises a terminal identifier to an equipment management server (EMS) via an optical line terminal (OLT) and send a service configuration request that comprises the terminal identifier to an terminal service configuration server; and receive service configuration information the terminal service configuration server, distinguish types of services accessed by service-accessing ports of the terminal device according to the received service configuration information, notify a traffic measuring module of the terminal device, and measure a traffic of each service type using the traffic measuring module of the terminal device;

the EMS, configured to receive the registration request from the terminal device, and obtain the terminal type, service-accessing ports type of the terminal device and number of service-accessing ports according to the terminal identifier in the registration request from the terminal device, and send the obtained information to an operation support system (OSS);

the OSS, configured to generate the service configuration information according to the obtained information from the EMS and sending the service configuration information to a terminal service configuration server;

the terminal service configuration server, configured to receive and store the service configuration information and upon receipt of a service configuration request message from the terminal device, obtain the associated service configuration information according to the terminal identifier in the service configuration request from the terminal device and send the service configuration information to the terminal device, wherein the service configuration information comprising a mapping relationship between service-accessing ports of the terminal device and types of services, wherein the types of services comprise any one of voice service, data service and video service.

2. A method for measuring traffic based on user services, comprising:

sending, by a terminal device, a registration request that comprises a terminal identifier to an equipment management server (EMS) via an optical line terminal (OLT), sending a service configuration request that comprises the terminal identifier to a terminal service configuration server and receiving a service configuration information from a terminal service configuration server;

receiving, by the EMS, the registration request, obtaining the terminal type, service-accessing ports type of the terminal device and number of service-accessing ports according to the terminal identifier in the registration request from the terminal device, and sending the obtained information to an operation support system (OSS);

generating, by the OSS, the service configuration information according to the obtained information from the EMS and sending the service configuration information to the terminal service configuration server; and receiving and storing, by the terminal service configuration server, the service configuration information and upon receipt of a service configuration request message from the terminal device, obtaining the associated service configuration information according to the terminal identifier in the service configuration request from the terminal device and sending the service configuration information to the terminal device, wherein the service configuration information comprising a mapping relationship between service-accessing ports of the terminal device and types of services, wherein the types of services comprise any one of voice service, data service and video service;

distinguishing, by the terminal device, types of services accessed by service-accessing ports of the terminal device according to the received service configuration information and notifying a traffic measuring module of the terminal device; and measuring, by the terminal device, traffic of each of the distinguished service types using the traffic measuring module of the terminal device.

3. The method of claim 2, wherein the method further comprises: sending, by the terminal device, traffic measurement information to a charging management server.

4. The method of claim 3, wherein the traffic measurement information comprises terminal identifier information, service type titles, and uplink and downlink traffic of each service type.

* * * * *